US010388040B2

(12) United States Patent
Trim et al.

(10) Patent No.: US 10,388,040 B2
(45) Date of Patent: Aug. 20, 2019

(54) MODELING ACTOR AND ASSET RELATIONSHIPS

(71) Applicant: Microsoft Technology Licensing, LLC, Redmond, WA (US)

(72) Inventors: Samuel Terrence Trim, Sammamish, WA (US); Patricia Anne Donnellan, Redmond, WA (US); Eliyohu Aron Inger, Bellevue, WA (US); Keying Li, Bellevue, WA (US); Praneeth Reddy Vatti, Redmond, WA (US); Yan Guo, San Francisco, CA (US); Senthil Vel Gunasekaran, Duvall, WA (US); Nagarjuna Aravapalli, Redmond, WA (US); Neeta Vinod Atal, Redmond, WA (US); Priyatham Reddy Allala, Bellevue, WA (US); Stephen Robert White, Kirkland, WA (US); Xiaoming Wang, Bellevue, WA (US); Michael Gordon Hale, Redmond, WA (US); Jason Drew Black, Maple Valley, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 28 days.

(21) Appl. No.: 15/640,253

(22) Filed: Jun. 30, 2017

(65) Prior Publication Data

US 2019/0005692 A1    Jan. 3, 2019

(51) Int. Cl.
*G06T 11/20*    (2006.01)
*G06T 11/00*    (2006.01)
(Continued)

(52) U.S. Cl.
CPC ............ *G06T 11/206* (2013.01); *G06F 17/18* (2013.01); *G06Q 10/06* (2013.01); *G06T 11/001* (2013.01)

(58) Field of Classification Search
USPC .................................................. 705/342, 700
See application file for complete search history.

(56) References Cited

U.S. PATENT DOCUMENTS 9,626,609 B1    4/2017 Ferguson
2004/0002998 A1    1/2004 Takahashi et al.
(Continued)

FOREIGN PATENT DOCUMENTS

JP    H01152567 A    6/1989
JP    2010204733 A    9/2010

OTHER PUBLICATIONS

Sacha, et al., "Knowledge Generation Model for Visual Analytics", In Proceedings of IEEE transactions on visualization and computer graphics, vol. 20, Issue 12, Dec. 31, 2014, 10 pages.
(Continued)

*Primary Examiner* — Wesner Sajous
(74) *Attorney, Agent, or Firm* — Workman Nydegger

(57) ABSTRACT

Displaying a representation of an asset. The method includes an act of displaying a different representation for at least a first actor of the one or more actors. An asset being an item capable of being owned, and actors being entities capable of owning an asset. The method also includes displaying the representation of the asset and displaying the different representation for the first actor such that a likelihood of the first actor owning the asset can be evaluated based on the representation and the different representation.

20 Claims, 7 Drawing Sheets

(51) Int. Cl.
*G06F 17/18* (2006.01)
*G06Q 10/06* (2012.01)
*G06F 17/30* (2006.01)
*G06Q 10/10* (2012.01)

(56) References Cited

U.S. PATENT DOCUMENTS

| | | | |
|---|---|---|---|
| 2005/0028008 A1* | 2/2005 | Kumar | G06F 21/6227 726/2 |
| 2008/0086323 A1* | 4/2008 | Petrie | G06F 17/30386 705/342 |
| 2008/0086427 A1* | 4/2008 | Wallace | G06Q 10/10 705/36 R |
| 2008/0086509 A1* | 4/2008 | Wallace | G06Q 10/10 |
| 2008/0086685 A1* | 4/2008 | Janky | G06Q 10/087 715/700 |
| 2011/0289459 A1* | 11/2011 | Athans | G06F 3/0481 715/854 |
| 2012/0124194 A1 | 5/2012 | Shouraboura | |
| 2013/0013284 A1 | 1/2013 | Wang et al. | |
| 2013/0326050 A1 | 12/2013 | Halabi | |
| 2014/0150057 A1 | 5/2014 | Zhong et al. | |
| 2014/0327518 A1 | 11/2014 | Loutit | |
| 2015/0371160 A1 | 12/2015 | Weatherhead et al. | |
| 2016/0274553 A1 | 9/2016 | Strohmenger et al. | |
| 2016/0371306 A1 | 12/2016 | Dengler | |

OTHER PUBLICATIONS

"eQuip! for IT Asset Management: All-in-One Asset Management Solutions for IT Assets and Beyond", http://www.e-isg.com/it-asset-management-solution/, Published on: 2015, 5 pages.

"Avantis Enterprise Asset Management Suite", http://software.schneider-electric.com/pdf/datasheet/avantis-enterprise-asset-management-suite/, Retrieved on May 19, 2017, 8 pages.

"International Search Report and Written Opinion Issued in PCT Application No. PCT/US2018/035248", dated Jul. 30, 2018, 11 Pages.

* cited by examiner

| Name | Actor Type | Number of Interactions | Ownership Score | Last Interaction | Frequency Score | Location | Alias |
|---|---|---|---|---|---|---|---|
| Server A123 | System | 1,486 | 99 | 5/31/2017 | 98 | Redmond, WA | S-A123-CompanyA |
| John Smith | User | 784 | 97 | 10/8/2016 | 85 | San Francisco, CA | JSmith@CompanyA.com |
| Sally Johnson | User | 116 | 94 | 6/1/2017 | 99 | Cleveland, OH | SJohnson@CompanyB.com |
| Vendor X | User | 5,724 | 30 | 5/12/2014 | 10 | Timbuktu, Mali | Sales@Vendor.com |

*FIG. 3A*

| Name | Ownership Score | Observed Interactions (for Asset) |
|---|---|---|
| Server A123 | 100 | 62.28% (1,486 / 2,386) |
| John Smith | 53 | 32.86% (784 / 2,386) |
| Sally Johnson | 8 | 4.86% (116 / 2,386) |

*FIG. 3B*

| Name | Ownership Score | Expected Interactions (Type of Asset) |
|---|---|---|
| Server A123 | 15 | 14.86% (1,486 / 10,000) |
| John Smith | 8 | 7.84% (784 / 10,000) |
| Sally Johnson | 1 | 1.16% (116 / 10,000) |

*FIG. 3C*

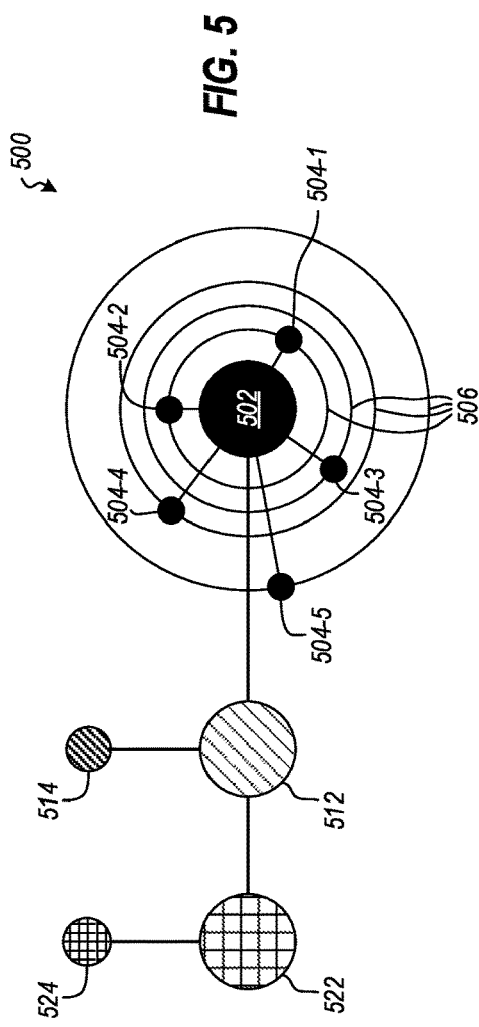
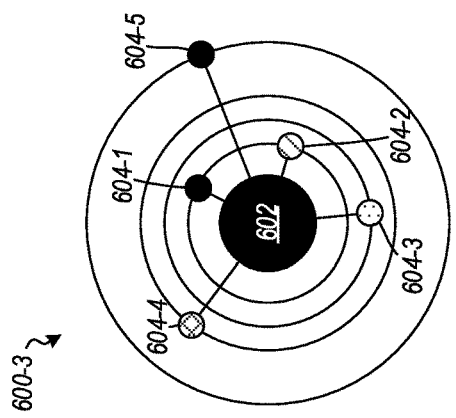
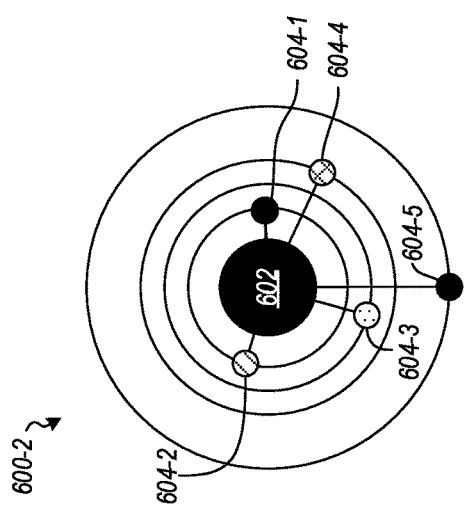
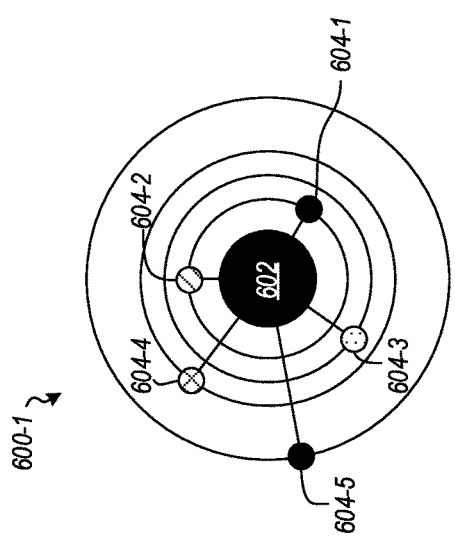

FIG. 7

MODELING ACTOR AND ASSET RELATIONSHIPS

BACKGROUND

Asset management can be a difficult proposition. This is especially true when large numbers of assets are involved and more so when an asset is broadened to include any item cable of being owned. For example, in computer system contexts, an asset may be at least as small as an IP address or at least as large as a data center. When an entity, such as an enterprise, manages large numbers of assets, ownership of such assets can be difficult to track and/or define. This could be done manually, for example, but this requires constant identification of newly deployed assets correlated with owners of the newly deployed assets. Additionally, ownership may change over time, which results in a constant need to update the asset/ownership correlation. As a further complicating factor, potential owners may span multiple work groups, departments, or organizations, and there may be inconsistencies or reporting errors between these entities with regard to the manner or mechanism of updating or identifying assets, deployments, and/or tracking ownership. Thus, tracking which assets exist in an enterprise may be a daunting task, and tracking the ownership of these assets may be an even more monumental task.

Not accurately tracking or characterizing assert-owner relationships can result in systems having deleterious characteristics. For example, in the context of a virus outbreak, it can be imperative to quickly identify the owner of an asset, alert the owner of a potential infection, and cause the owner to take remedial actions to remove the virus at the asset and/or to prevent the asset from spreading the virus to other parts of the system. If a system is incapable of identifying asset owners, the system may be more susceptible to damage and/or more widespread damage as compared to systems that are capable of quickly identifying asset owners.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing system. The method includes acts for displaying a representation of an asset. The method includes an act of displaying a different representation for at least a first actor of the one or more actors. An asset being an item capable of being owned, and actors being entities capable of owning an asset. The method also includes displaying the representation of the asset and displaying the different representation for the first actor such that a likelihood of the first actor owning the asset can be evaluated based on the representation and the different representation.

Another embodiment illustrated herein includes a computer system having processor(s) and computer storage media having stored thereon instructions that are executable by the processor(s) to configure the computer system to display representations of an asset and actor(s) to facilitate identification of an owner of the asset, including instructions that are executable to configure the computer system to display a representation of an asset and display a different representation for at least a first actor of the one or more actors such that displaying the representation of the asset and displaying the different representation for the first actor is performed so a likelihood of the first actor owning the asset can be evaluated based on the representation and the different representation.

In some embodiments, the representation and the different representation displayed by the computer system include elements of an orbital display. In such an embodiment, the computer-readable media can further have stored thereon instructions that are executable by the processor(s) to configure the computer system to display a related representation having a second asset disposed in physical and logical proximity to the asset. In some embodiments, the representation of the asset is positioned at the center of the orbital display and the different representation and/or the related representation are positioned in orbit around the representation of the asset, which, in some embodiments, the distance of the orbit away from the representation corresponds to the probability of the actor(s) owning the asset (e.g., a shorter distance away from the representation of the asset indicating a higher probability of ownership).

Another embodiment illustrated herein includes a computer system having processor(s) and computer storage media having stored thereon instructions that are executable by the processor(s) to configure the computer system to display representations of an asset and actor(s) to facilitate identification of an owner of the asset, including instructions that are executable to configure the computer system to display differentially-sized tiles. In some embodiments, each differentially-sized tile corresponds to a different actor having at least one interaction with the asset, and each differentially-sized tile is proportional to a likelihood the different actors represented by the differentially-sized tiles are an owner of the asset.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 3A illustrates an example of data output from a system facilitating identification of ownership of an asset.

FIG. 3B illustrates another example of data output from a system facilitating identification of ownership of an asset with the number of actor-asset interactions being normalized based on a total observed number of interactions for the observed asset.

FIG. 3C illustrates yet another example of data output from a system facilitating identification of ownership of an asset with the number of actor-asset interactions being normalized based on an expected number of actor-asset interactions given the type of asset observed.

FIG. 5 illustrates a snapshot of an interactive visual display for visually representing an asset and a plurality of actors to facilitate identification of an owner of the visualized asset.

FIG. 6A-6C illustrate a time lapse of a visual display similar to the visual display of FIG. 5. FIG. 6A illustrates a first time point. FIG. 6B illustrates a second time point, and FIG. 6C illustrates a third time point.

FIG. 7 illustrates a visual representation of actors that are proportionally sized with respect to a likelihood of ownership of an asset.

DETAILED DESCRIPTION

Figure 1:
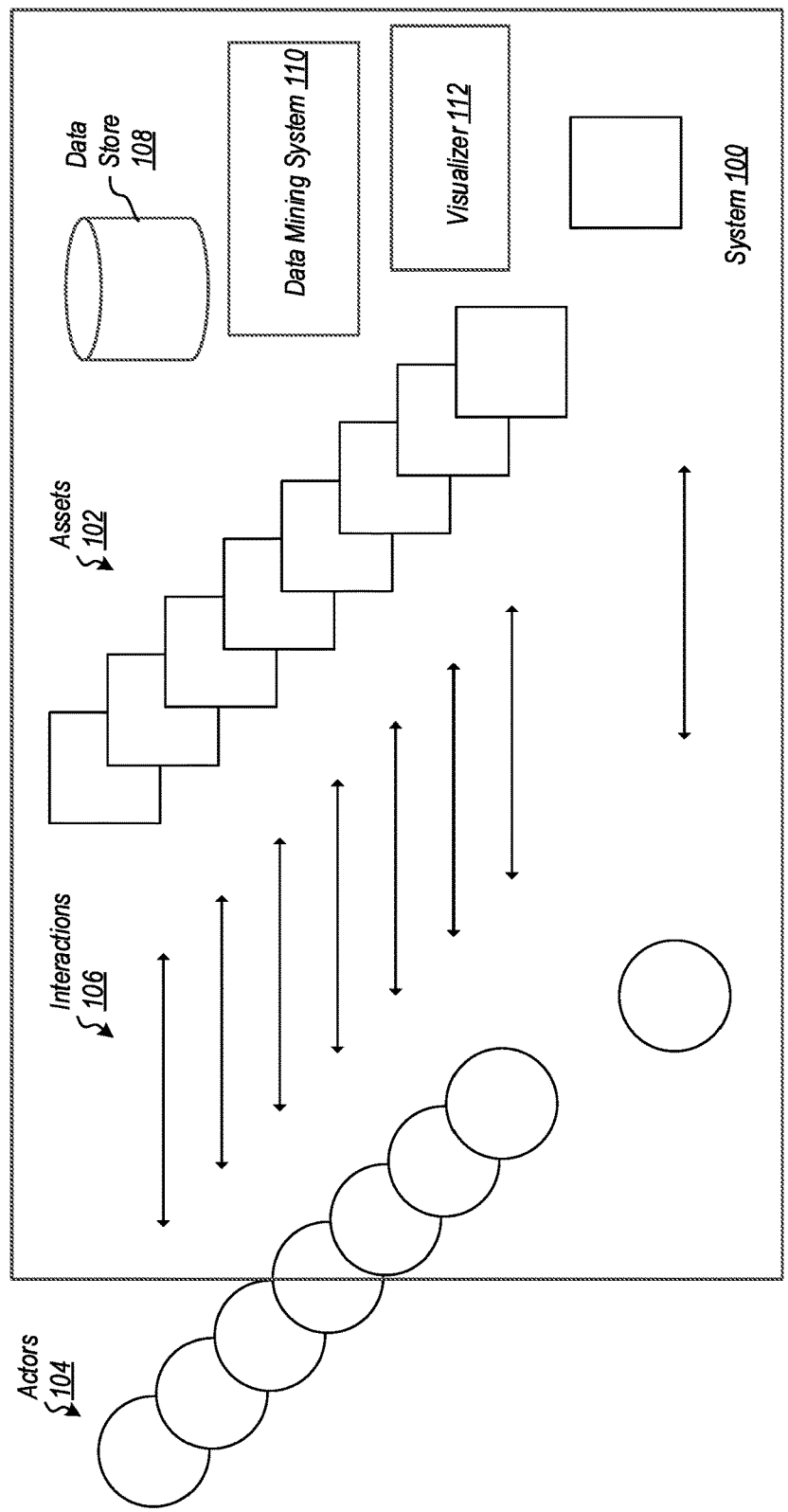
FIG. 1 illustrates an exemplary enterprise system having a plurality of assets and actors.

Some embodiments illustrated herein enable identification of assets and actors within a system. Embodiments are further able to identify interactions of actors with assets within the system. As illustrated herein, an "asset" is anything capable of being owned by an actor. Assets can be of any size or degree, as long as it is capable of being owned. For example, an asset can be as small as an IP address, user account, or data packet, or it can be as large as a server, database, or data center. As used herein, the term "actor" includes any entity that could potentially be the owner of an asset. For example, an actor can be a user who owns an account, or an actor can be a server that owns a virtual machine. In some cases, an asset has a plurality of owners. For example, with respect to an account, a user can be an owner of the account while simultaneously the account is owned by the computing system where it stored.

Typically, an actor is capable of interacting with an asset. Using the example above, the user can interact with the account by logging into the account. Similarly, the computing system can interact with the account by accessing and updating the account. The user and the computing system are both entities, and as demonstrated, such entities may be human actors or machine actors. When identifying an owner of an asset, it can be advantageous to first determine which actors are interacting with the asset.

For example, in one embodiment, an asset may be a computing device capable of being logged onto. Embodiments may monitor, or otherwise gather data, such as logon events, events triggered at the computing system after the logon event, or other data gathering methods, to identify when actors have logged onto the computing system. Each login is a kind of interaction between an actor and an asset, and the number and frequency of the logon events can be tracked over time as one indication of possible ownership. That is, in most circumstances an owner of an asset interacts with the asset a greater number of times than other entities and/or more frequently than other entities, and ownership can be characterized by the strength of interactions between an asset and an owner.

Note that certain entities could be both an actor (and potentially an owner) and an asset in different contexts. For example, a machine could act on another machine and thus be an actor. However, the first machine may be acted on by another machine or another user, and is capable of being owned, in which case the first machine is an asset.

For a given asset, implementations of the present disclosure enable the derivation of a probability that different actors own a given asset based on the quantity and frequency of interactions with the asset. In particular, each interaction between the asset and an actor can be used to generate an asset ownership score. It should be appreciated that assets can change ownership over time, and the most recent interactions can be more indicative of current ownership than previous interactions. Accordingly, in some embodiments, interactions may be weighted based on the age of the interaction—when it occurred in time with respect to the present or another point in time. For example, recent interactions may be given a higher weight than interactions that occurred in the distant past. Thus, in some embodiments, a decay factor may be applied to the interactions to influence the asset ownership score.

Using the asset ownership score, information can be provided to assist in identifying which actors are likely to have ownership of assets within a given system. This information can be used for several different purposes. For example, asset ownership scores can be used to identify owners of assets when notifications about an asset need to be made. Alternatively, or additionally, asset ownership scores can be used to notify the likely owners of assets that remedial actions need to be taken to protect the system. Alternatively, or additionally, asset ownership scores may be used to identify likely owners for recovering costs for asset usage by ensuring that costs are allocated to the correct owner of the asset.

Embodiments illustrated herein enable implementation of an improved computing system over previous computing systems. For example, some embodiments enable a computing system that is able to identify owners of assets, notify the owners of the assets, and cause the owners of the assets to take remedial actions to protect or improve the functioning of the system. For example, consider a case where a system experiences a virus attack. It may be imperative that certain assets are disabled to prevent spread of the attack. To do so, it may be necessary to identify the owner of the asset, and cause the owner of the asset to disable the asset. Alternatively, or additionally, it may be important to identify assets that have been infected and to notify owners of those assets so that the assets can be cleaned and prevented from further propagating the virus. This task may be simple in a small system with limited assets and actors, but it becomes a monumental task when the system is complex with a large number of assets and actors, some of which are dynamically changing and are difficult to track.

Alternatively, or additionally, some embodiments may be implemented in the context of a social media system. In this example, an asset may be a social media post or publication, and embodiments can identify the owners of post or publication. Similarly, an asset may be a social media user account, and embodiments of the present disclosure can identify an actor who owns the user account. As alluded to above, the actor can be a computing system(s) used to access the social media account and/or the particular user(s) who own the social media account. Such information could be used to identify malicious machine networks (botnets), combat fake accounts, to mitigate fake news articles, to remove posts that make the system more navigable, safe, responsive, etc. In some embodiments, the systems and/or methods disclosed herein of facilitating identification of asset ownership can be used in a social media or search context for interest graph tuning, honing the relevance of advertisement and/or job search opportunities, or similar.

In some embodiments, the systems and/or methods disclosed herein can be implemented within an information technology and/or information technology asset management context to enable intelligent inventory, inventory risk categorization, provide business intelligence insights, humanistic organizational experiences, asset monetization, etc. For example, the functionality of the systems and/or methods illustrated herein could enable creation of a computing system that implements automatic updates to inventory tracking or asset ownership rather than requiring human intervention. As an additional example, embodiments of the present disclosure can enable a determination that of an owner of an asset is an electronic entity, such as a computer system, a group of computer systems, or component(s) thereof, and allow the asset can be managed automatically by the non-human owner based on pre-defined or user-defined standards of the electronic entity instead of waiting on human-user intervention (e.g., installing and/or implementing updates without human intervention.)

In some implementations, it is desirable to notify or request user interaction with respect to a given asset. In such instances, and where an electronic entity is identified as the owner of an asset, the owner of the electronic entity can be determined (and so forth up the hierarchal chain of asset ownership) until a user or human actor is identified as an owner in the hierarchy of asset ownership. The user or human actor can then be notified and/or requested for a particular action. For example, a user account can be compromised, and embodiments of the present disclosure can enable identification of an owner of the compromised account—one or more of a human actor that owns the compromised account, a computing system used to access the compromised user account, or a hardware storage device where the compromised account is stored—and can, in some embodiments, report any of the foregoing information to, for example, an owner of the hardware storage device storing the compromised account. However, the immediate owner of the hardware storage device may be a computing system within a data center. It may be desirable to quarantine the compromised account, and notifying the computing system of the compromised account may not result in the desired response, and even if it does, it may nonetheless be desirable to notify the owner the affected computing system. Accordingly, in some embodiments, the hierarchy of ownership can be followed until, for example, the owner of the computing system is identified and notified (e.g., the administrator of the data center).

In regards to a situation where a machine (non-human) entity surfaces to the top AND embodiments are looking for a human entity for ownership or accountability, there are several ways to achieve this. In one example, computed asset owners can be viewed in clusters of actors which clump together. Looking at the high scoring cluster of human entities can allow a human or system to derive ownership from the commonality of that pool of actors. In an alternative or additional embodiment, for both human and machine actors there is a concept of association. A machine actor has an association to its creator(s). For a human an association is determined from a hierarchical standpoint; for instance a manager or management chain.

Machine actors can own other machines, especially in the concept of a virtualized systems in which a controller can spawn and destroy assets at will. It, in a sense can be deemed an asset owner, allowing the lines of ownership to be open to both human and/or machine entities. Ownership is an agnostic concept.

For example, consider robotics. A robot in a datacenter that is assigned to a specific rack/row of nodes is one of the responsible parties for maintenance and disposal of an asset. This, showing ownership transcends typical human to inanimate object ownership concepts. Also quite potentially, it introduces a bilateral concept in which machines could be owners of human assets. For example, a machine could 'own' technicians for deployments for maintenance management on a complex and evolving system. Alternatively, machines could own troop deployments for war fighter management on a complex and evolving battlefield. Etc.

Computer Systems for Facilitating Identification of Ownership of an Asset

Referring now to the figures, FIG. 1 illustrates an example system 100. In the example illustrated in FIG. 1, the system 100 includes assets 102. As noted previously, an asset is anything capable of being owned. For example, in a computer system, an asset may be at least as small as an IP address or as large as a data center, with any one of a number of different items in-between, such as accounts, peripheral devices, computer systems, network components, storage components, computer components, etc. In social media systems, an asset may be at least as small as a social media post or at least as large as a server farm hosting machines, with any one of a number of different items in-between. In a security context, an asset may be at least as small as a process or at least as large as a computing data center.

FIG. 1 further illustrates a plurality of actors 104. An actor is an entity that could potentially be an owner of an asset. As noted above, an actor in the actors 104 maybe any one or more of a number of different entities. For example, an actor might be a user or client, whether human, computing device, or other entity such as a department, work group, or business entity. Alternatively, or additionally, an actor might be a process. As illustrated in FIG. 1, some of the actors 104 may actually be part of the system 100. For example, an asset 102 can be an account, and an actor 106 within the system can be a processor that interacts with the account (e.g., to update the account information).

In alternative embodiments, some of the actors 104 may be external to the system 100. For example, considering the asset 106 in the example provided above, where the asset 106 is an account, an actor 104 who is external to the system 100 can be a user who logs in to the account from a system remote from the system 100. Similarly, an actor 105 that is external to the system can be a remote computing system in logical communication with the system 100, that accesses the account to retrieve and/or store information. On a larger scale and in some embodiments, an asset can be in a distributed computing environment where pieces of the asset are scattered among a plurality of computing systems comprising a system, and one or more actors access the asset at each of a plurality of different computing systems outside the defined system.

In some embodiments, an actor may be partially part of the system 100 and partially implemented external to the system 100. For example, an asset can be a virtual machine housed within system 100. The virtual machine can, itself, have partitioned or dedicated resources within the system 100 (e.g., processor(s), hardware storage device(s), etc.), and from the perspective of the virtual machine, processor(s) or hardware storage device(s) that have been at least partially dedicated to the functioning of the virtual machine can also be used by the system 100 as actors to interact with the virtual machine. In this way, the actor can be said to be both inside and outside of the system.

As noted previously, actors interact with assets. This is represented in FIG. 1 by the interactions 106. Interactions may be any number of different actions. For example, an interaction 106 may be a logon event whereby an actor logs on to an asset. Alternatively, or additionally, in the social media context, an interaction may be a social media interaction such as a "like" or "share" when the asset is a social media status, publication, or similar. Alternatively, or additionally, when an asset is a process, an interaction may be an initialization of execution of the process.

The system of FIG. 1 additionally includes a data store 108. The data store 108 of FIG. 1 is configured to store information about the interactions 106. The information stored about the interaction can be any information related to the actor, asset, and/or interaction (e.g., a name of an actor, a date and/or time the interaction occurred, the type of interaction, a logical or physical location of the actor, etc.). In one implementation, the data store 108 is connected to logging circuitry that is configured to log interactions 106 between actors 104 and one or more with assets 102. It should be appreciated that in some embodiments, a log or dataset detailing interaction information can, itself, be an asset, and in some embodiments, one or more of the assets are stored within the data store. It is, therefore, important to note and appreciate that in some embodiments, the granularity of assets and interactions that are being (or can be) tracked and analyzed by implementations of the present disclosure is fine and/or detailed. Accordingly, depending on the size of the system and the number and type of actors, assets, and interactions that are being identified, tacked and/or analyzed, the resulting dataset can be large (e.g., terabytes, petabytes, or larger).

As shown in FIG. 1, the system 100 additionally includes a data mining system 110. The data mining system 110 is coupled to the data store 108 and configured to receive and analyze data from the data store 108. In particular, the data mining system 110 is able to perform various scoring algorithms based on the interactions 106 between actors 104 and assets 102. In particular, such scoring algorithms may be configured to identify actors 104 that are owners of one or more assets 102 based on the interactions 106. In some embodiments, the scoring algorithms can be used to provide a ranked-order of likely owners.

Exemplary scoring algorithms can include an asset-ownership scoring algorithm, which produces an asset ownership score, and a frequency scoring algorithm, which produces a frequency score. In some embodiments, the asset ownership score and/or the frequency score are unit-less numbers that are normalized to an arbitrary scale (e.g., a number between 1-10, 1-20, 1-25, 1-50, 1-100, 1-1,000, 1-10,000, or any range of numbers chosen for any or no reason). In some embodiments, the asset ownership score is normalized to the same scale as the frequency score.

In some embodiments, the number of interactions between each actor and the asset are normalized based on the overall distribution of interactions in the entire observed universe of assets and actors. This is accomplished by normalizing each ownership score to the quantile it belongs to over all the scores in the system. For example, a score of 90 would represent that 90 percent of all actor asset pairs in the system have a lower ownership score than this. When using this embodiment, the ownership score provides two distinct pieces of information that may be useful in determining the probability of ownership. First the score is comparable to the relative scores of other actors to the same asset. For example, scores of 30, 10, and 10 would indicate the actor with a score of 30 is the most probable owner of this asset among the three actors. However, the score of 30 also indicates that 100−30=70 percent of all actor/asset pairs in the system have more interactions than this actor and asset. This example would convey that from interaction based evidence there is no strong candidate for ownership. But amongst all the weak candidates, this actor is the most probable. An additional advantage this approach to normalization has is that it is self-correcting and automatically readjusted every day to the range of scores in the system.

Considering the asset-ownership scoring algorithm, in some embodiments, the resulting asset ownership score is a quantitative score that indicates the relative strength or likelihood an actor is an owner of a given asset based on the number of interactions between the actor and the given asset. While not limiting, a higher asset ownership score can be indicative of a higher probability that the actor is an owner of the asset, while a lower asset ownership score can be indicative of a lower probability or affinity an actor has in regards to owning an asset. The normalization process for arriving at the final asset ownership score may take into account, for example, the proportion of interactions an actor has with a given asset compared to the total number of interactions for all actors and the given asset. For example, an asset may have registered a total of 50 interactions, 25 of which were from a first actor and 15 of which were from a second actor, and 10 of which were from a third actor. The first actor may be given a score of 100 (e.g., on a scale of 1-100), indicating it has the highest number of interactions with the asset compared to other actors—even though the first actor only accounts for 50% of the total interactions between the asset and all identified actors. The second actor can be given a score of 60 (when normalized proportionally to the number of identified interactions between the first actor and the asset), and the third actor can be given a score of 40 (when normalized proportionally to the number of identified interactions between the first actor and the asset). In the foregoing simplified example, the asset ownership score provides a quick indication of the likely owner of an asset and additionally provides a quantitative and qualitative indication of confidence.

In some embodiments, the number of interactions between each actor and the asset are normalized based on the type of asset. Referring to the example directly above, the asset may be a type of asset that is expected to have 50 interactions from a typical or predefined owner, as opposed to a cumulative 50 interactions from all actors. Accordingly, the asset ownership scores for the actors can be normalized based on the type of asset to, thereby, provide a contextualized likelihood of asset ownership. Using the same number of interactions provided in the previous example, the actors would, therefore, receive asset ownership score of 50, 30, and 20, respectively (compared to a hypothetical expectation where an asset having 50 interactions is set at the arbitrary high end of the normalized scale-100).

It should be appreciated that in some embodiments, a number greater than the upper end of the arbitrary scale can be achieved if, for example, the actor was identified as having a greater number of interactions than expected. In such an embodiment, a second normalization may occur, setting the outlier to the arbitrary high end of the normalized scale. For example, a fourth actor may have 60 identified interactions, and when using a model based on 50 interactions from a typical or predefined owner, the fourth actor would be given an asset ownership score of 120. A second normalization can occur to bring the outlying fourth actor score of 120 within the bounds of the scoring scale. Doing so results in the fourth actor being given a score of 100 with the first, second, and third actors being scaled proportionally to asset ownership scores of 42, 25, and 17, respectively. The asset ownership score, in many embodiments, enables the identification of a likely owner of an asset and can provide context with respect to other identified actors and/or with respect to the type of asset.

In some embodiments, the asset-ownership scoring algorithm qualifies the interactions of each actor with a given asset based on temporal factors. In a simplified example, the asset-ownership scoring algorithm only counts interactions that occurred after a given point in time or within a given time period. This can be allow a time-dependent analysis of ownership such that ownership of an asset at a given time or after a certain point can be identified instead of considering all interactions at all times. Additionally, or alternatively, the asset-ownership scoring algorithm can apply a decay factor to the interactions, causing a reduction in the significance of each identified interaction as it ages with respect to the current time or with respect to a specified time in the past. In doing so, the decay factor allows interactions that have occurred more recently to be given a more prominent weight when determining an asset ownership score. In other words, a decay factor can weigh individual interactions such that the weight associated with each interaction is inversely proportional to the amount of time elapsed since the interaction.

In some embodiments, the decay factor can be parametrized and set automatically or defined by a user. Alternatively, or additionally, the decay factor can generate an exponential, logarithmic, polynomial, or linear decay (or some combination thereof) to each interaction and can be chosen based on characteristics of the asset, actors, and/or system. For example, if ownership of an asset is volatile, the most recent interactions are likely the most indicative of ownership while the more historic interactions are less likely to indicate current ownership. In such a volatile system, the decay factor may quickly (e.g., exponentially, logarithmically, polynomially, or a combination thereof) reduce the weight of each interaction as it ages so that the most recent interactions are weighted the most heavily when deriving/computing an asset ownership score. On the other hand, if ownership of an asset is traditionally stable, the decay factor may induce a delayed reduction in weighting interactions (e.g., a delay of weeks, months, or years before applying a decay to the interactions, thereby causing a reduction in the significance of the identified interactions). Alternatively, or additionally, the decay factor may apply a more reserved decay to the interactions such that there are smaller differences in the significance of interactions that span shorter passages of time (e.g., seconds, minutes, hours, days, or even weeks) with greater differences in the significance of interactions being present between interactions that occur between longer passages of time (e.g., weeks, months, or years).

In some embodiments, the decay factor is applied to each interaction, and the weighted combination of the interactions result in an asset ownership score. In other embodiments, the decay factor is calculated based on an average (or other factor such as a mean, standard deviation, etc.) interaction age and applied to the calculated asset ownership score.

In some embodiments, an owner of an asset is likely to interact with the asset more frequently in a period of time than a non-owner. Accordingly, in some embodiments, a frequency score algorithm is additionally, or alternatively, derived, and the resultant frequency score illustrates a frequency with which actors interact with assets. The frequency score can provide insights into the interactions that may otherwise be lost by only calculating an asset ownership score. For example, a frequency score can provide insights into cyclical interaction behaviors, or it may provide additional insights into the regularity of interactions that can be lost when simply viewing the number of interactions over a given period of time. In some embodiments, the frequency score can be normalized in any of the same or similar ways recited above with respect to the asset ownership score and can additionally, or alternatively, have the same or different decay factor applied, as described above. In some embodiments, a baseline frequency may be used and scores can be normalized around the baseline frequency. For example, a baseline frequency may be an actual or expected frequency that most likely represents an ownership relationship. Frequency above or below the baseline may indicate lower (or in some cases higher) probability of an ownership relationship. Thus, a frequency score can be adjusted accordingly.

As alluded to above, in some embodiments, the data set used to calculate an asset ownership score and/or frequency score is very large. In such embodiments, the data mining system may be a distributed or cloud-based system that takes advantage of the increased processing power and computing resources of a distributed system to more quickly and efficiently derive the various scores that aid in a determination of the likelihood an asset is owned by one or more actors. Interaction data may be continually tracked and/or stored, and it may be advantageous to have a regularly updated dataset indicative of asset ownership, particularly with respect to volatile assets whose ownership can change or has a tendency to change quickly. Additionally, or alternatively, it may be advantageous to have a dynamic system that is responsive to changes in asset ownership, regardless of the volatility of asset ownership. For example, having a regularly updated asset ownership dataset can enable a system to more quickly and accurately respond to a cyber-security threat or to confidently identify an owner of an asset for reporting and maintenance purposes (e.g., accounting, maintenance, etc.). Thus, in many embodiments, updating a dataset reflecting asset ownership on a daily basis (or every other day, every three days, every four days, every five days, every six days, weekly, bi-weekly, monthly, or other regular interval) is desirable, even though it may be a potentially resource-intensive act. In such embodiments, the processing and computing resources of a distributed or cloud-based system can enable the rapid updates sought.

In some embodiments, the scores quantifying the probability of actor ownership of assets can be visualized. For example, the system 100 of FIG. 1 includes a visualizer 112 that is coupled to the data mining system 110. The actors can be visualized—with or without their accompanying asset ownership and/or frequency scores—at the system 100 or at a remote computing system/display. The visualizer 112 may include various software and hardware devices for outputting representations. In some embodiments, the visualizer 112 includes one or more display devices that allows human users to visually see the representations. In these examples, the visualizer 112 includes software components to render the visualizations to hardware output devices, such as video cards, which are further configured to output the visualizations to display devices, such as computer displays.

Note that in other embodiments, the visualizer 112 may alternatively include data interfaces to connect to other devices, which can use the visualizations to attempt to identify ownership of an asset. In particular, machine actors may receive visualizations and process the visualizations to attempt to identify owners of an asset.

The visualizer 112 is able to provide various representations with respect to the actions performed by the data mining system 110. For example, the visualizer 112 may be configured to provide various representations of asset ownership scores and/or frequency scores produced by the data mining system 110. For example, as will be illustrated in more detail below, some embodiments may be configured to display a data table (which may or may not be viewable) wherein each actor is included in a row of the table along with an ownership probability score for the actor. The data table may be arranged, in some embodiments, in a ranked order of actors based on any of the ownership score, frequency score, or combination thereof. The data table may include a plurality of identifying characteristics for each actor listed.

Figure 2:
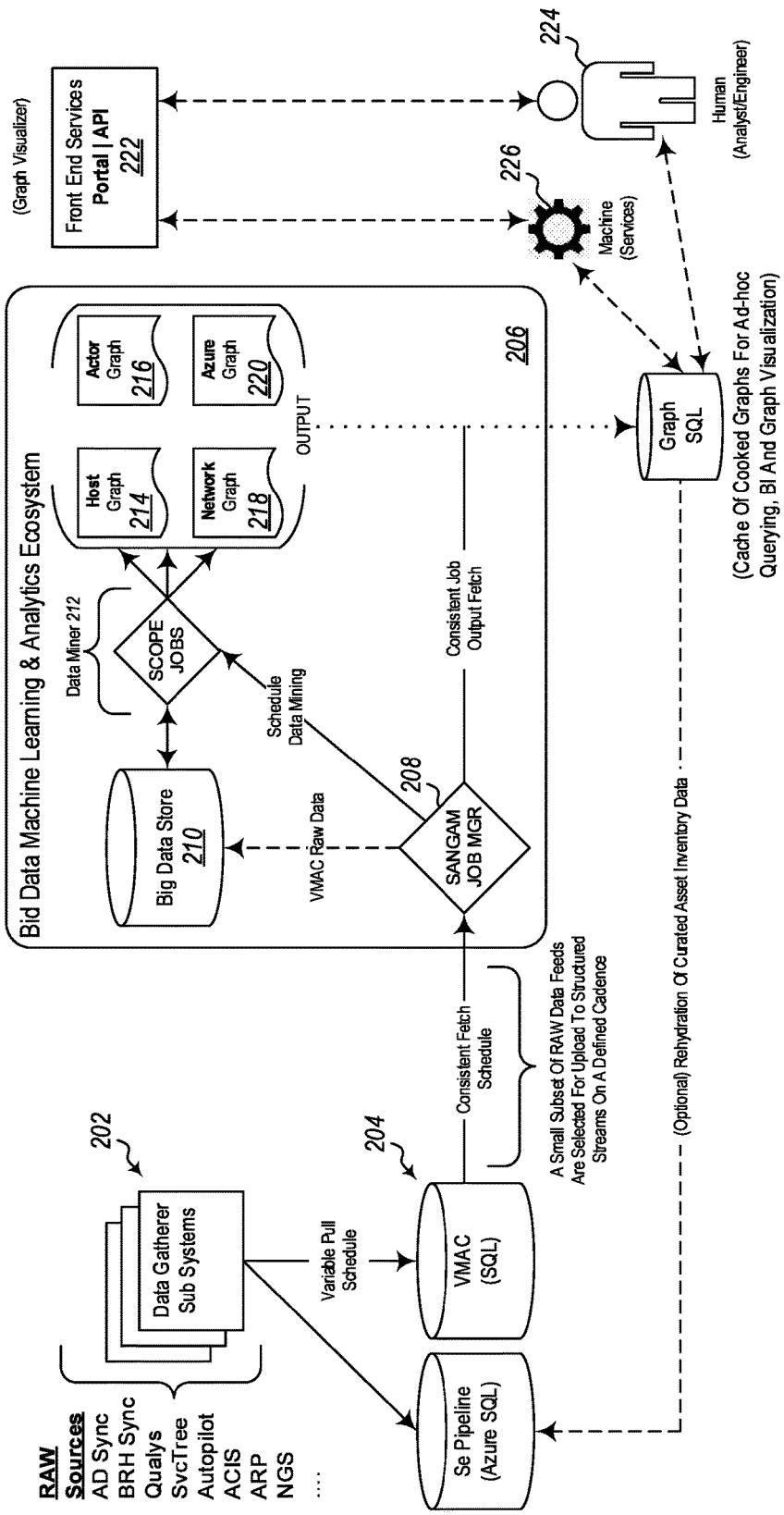
FIG. 2 illustrates an exemplary asset management system for implementing one or more systems and/or methods of the present disclosure.

Referring now to FIG. 2, a more detailed illustration of one embodiment is illustrated. FIG. 2 illustrates various data processing components and visualization components that might be implemented in a system, such as system 100 illustrated and FIG. 1. FIG. 2 illustrates data gatherer subsystems 202. The data gatherer subsystems 202 are configured to gather data from various sources. For example, data may be collected and mined daily (or at other intervals) from various infrastructure data sources—such as operating system, or other system event logs, router traffic logs (which show a ternary relationship of name, location, time, e.g., Hostname (name), IP Address (location), Event log Time (time)); ARP tables (routing tables hosted on a system or network device); Intrusion detection systems; interaction log data itself (WEC/WEF); network device configuration (despite crafted by humans unless on a SDN (software defined network)) (this data represents links and connections to other devices in a infrastructure system); a domain directory service such as Active Directory available from Microsoft, Corporation of Redmond, Wash.; vulnerability information and data stored in a SIEM (security information management system(s)) such as that provided by Qualys, Inc. Of Redwood Shores, Calif., Windows Defender or Windows Firewall available from Microsoft, Corporation of Redmond, Wash.; information collected from Windows Event Collection/Windows Event Forwarding (WEC/WEF) available and systems from Microsoft, Corporation of Redmond, Wash., HR, Autopilot, HWIS, IP Management, etc.

The information collected from the gatherer subsystems 202 may be stored in various databases 204. For example, as illustrated in FIG. 2, these databases 204 can be viewed as security information and event management aggregation points. These may be custom produced products, off-the-shelf products or combinations thereof. The database 204 could comprise something as simple as an event log on a single system in which it retains a local database of events (system, security, application, etc.) that are both relative to the system and/or the ecosystem in which it resides. Other implementations could be a collection of logs that are made indexable and searchable through a tool, such as SPLUNK available from Splunk Inc., of San Francisco, Calif. A log aggregator makes collections of infrastructure data queryable and accessible as an input source to other systems.

Also illustrated in FIG. 2, certain data feeds are selected for uploading to a big data machine learning and analytics ecosystem 206. The big data machine learning and analytics ecosystem 206 includes a job manager 208, which controls and monitors ingress and egress of data through the big data machine learning and analytics ecosystem 206. In some embodiments, the job manager 208 is able to store data in a big data store 210. In the example illustrated and FIG. 2, the big data store 210 may be a Azure Datalake or Azure Cosmos Database, both available from Microsoft, Corporation of Redmond, Wash., or Hadoop available from Apache Software Foundation of Forest Hills, Md.

The job manager 208 is further configured to communicate with a data miner 212. The data miner 212 is configured to create various graphs. For example, as illustrated in FIG. 2, the data miner 212 creates graphs that represent collection curated asset graphs, representing the best representation of known asset intelligence across a system. For example, such a system may be a cloud system, enterprise system, social media system, etc. In the example illustrated and FIG. 2, a host graph 214 is created. The host graph 214 illustrates various details with respect to interactions with various hosts in a system. FIG. 2 further illustrates an actor graph 216. The actor graph 216 illustrates various details with respect to actions performed by actors in the system. FIG. 2 further illustrates a network graph 218. The network graph 218 illustrates various details with respect to actions performed by network components. This also represent the structural layout (sometimes quantified as the "bones" or "skeletal structure" of an ecosystem) Assets can be aligned to the network graph to better identify relationships of assets and actors within or across segments of an ecosystem. FIG. 2 further illustrates a cloud graph 220. The cloud graph illustrates various details with respect to . . . . The Cloud graph is graph that represents ownership of assets in a cloud boundary. This is different from the host graph which in this case represents the bare-metal components (servers, network devices, device racks, etc.). In a holistic cloud ecosystem, the host graph represents the components of an on-prem ecosystem, the cloud graph represents components of a cloud ecosystem. Together (host+cloud) represent what is known as a "Hybrid-Cloud" scenario. Each of these graphs has a symbiotic relationship to other graphs, such as, for example, either revolving around actors or around time itself. The collection of these graphs are known, in some embodiments, as the orbital graph illustrated herein. Additional graphs can be derived from the orbital graph as additional feature extraction and analysis is performed against these initial graph segments FIG. 2 further illustrates front end services 222. The front end services 222 may include for example various graph visualizers, and/or other APIs. The front end services 222 may include functionality for authenticating users such that in some embodiments only appropriate users are able to use the front end services 222 in identifying actors interacting with assets to identify potential owners of assets.

FIG. 2 further illustrates that various entities can interact with the front end services 222. In particular, in some embodiments a human administrator 224 may interact with the front end services 222 to evaluate actor, asset, interaction, and ownership information. Alternatively or additionally, machine services 226 may interact with the front in services 222 to automatically evaluate actor, asset, interaction, and ownership information. For example, in some embodiments, a machine service 226 may identify a virus outbreak. The machine service 226 may have information with respect to which assets are infected in the virus outbreak. The machine service 206 and then attempt to identify owners of compromised assets using the front in services 222. Once this information has been attained, machine services can automatically notify owners of the infection and cause the owners to perform a remedial action.

FIG. 2 further illustrates an egress point for cooked graphs available for rehydration to other systems, services, and analysts. This represents a flow of computed asset inventory metadata and computed ownership data which can be pushed towards downstream systems such as a CMDB (making it a more dynamic system), SIEM systems who need asset ownership data to improve quality of detections and remediation techniques used in the incident management chain.

This approach of mining asset information from the infrastructure and processing leads to a higher quality collection of asset metadata and ownership intelligence versus traditional systems which rely on human attribution and tend to grow stale as the business scales.

As provided above, systems for facilitating identification of asset ownership can display various representations of asset ownership, including data tables arranged in a rank-order of actors based on any of the ownership score, frequency score, or a combination thereof with respect to a given asset. In some embodiments, the actors are not rank-ordered but are, instead, ordered randomly or according to some other variable (e.g., alphabetically, by last interaction date and/or time, by number of interactions, etc.). The data table may include any amount of identifying characteristics for each actor listed within the table in addition to or instead of the scores used to rank-order each actor. For example, as shown in FIG. 3A, a data table is provided that includes the actor's name, type, number of interactions, ownership score, last interaction, frequency score, physical or logical location for each actor, and any registered or known alias for each actor. The actors of FIG. 3A are arranged in a ranked-order by ownership score.

With continued reference to FIG. 3A, it is apparent that the ownership score is not simply proportional to the total number of interactions of each actor with the asset. For example, "Vendor X" has the highest number of interactions but has the lowest ownership score. This could be a result of, for example, the application of a decay factor that reduced the significance of the large number of interactions Vendor X had with the asset and can be indicative of an aged relationship. For example, Vendor X may have been a vendor for a given work group in years past and would access a given computing system (i.e., the visualized asset) to enter invoices, but the work group stopped using the vendor, bringing a drought to the identified interactions and a subsequent reduction in ownership probability. That is, Vendor X may have the bulk of its many interactions with the asset at a time in the distant past such that the decay factor reduces each interaction significantly, thereby reducing the overall ownership score of Vendor X.

It should also be noted that in FIG. 3A, there are machine and human actors listed as potential owners. This can be indicative of the versatility of the ownership score and/or it can exemplify the agnostic approach of asset ownership with respect to human or machine actors.

Referring now to FIG. 3B, illustrated are the first three actors of FIG. 3A along with the accompanying ownership scores and a percent observed interactions for a given asset. In the example shown in FIG. 3B, there is no decay factor applied to the ownership scores of the three depicted actors. Instead, the ownership scores illustrate a normalization based on the number of interactions observed between the three actors at the given asset. Accordingly, the actor with the highest number of interactions is given the highest asset ownership score (i.e., 100) and the remaining actors are scaled from that value based on the number of interactions that have individually been identified for each actor.

FIG. 3C, on the other hand, illustrates the actors from FIG. 3B normalized based on the type of asset, or more particularly, the expected number of interactions for an owner given the type of asset observed. As shown in FIG. 3C, the expected number of interactions is 10,000, and each of the actors is normalized according to that value, rendering asset ownership scores significantly less than those derived in FIG. 3B. In some ways, the asset ownership scores of FIG. 3C illustrate a system view of likely asset ownership given a type of asset, making the three illustrated actors less likely to be owners than perhaps other actors not shown or identified. Alternatively, the asset ownership scores shown in FIG. 3B may indicate that the asset is not behaving like a typical asset of that particular asset type, or the atypical asset ownership may be indicative of an operationally orphaned or under-utilized asset. Accordingly, in some embodiments, aspects of the present disclosure can be used to identify or otherwise characterize assets with respect to similar assets for diagnostic purposes and/or to increase the efficiency of asset utilization.

FIGS. 3A-3C illustrate three actors and their likely ownership of a given asset, but it should be appreciated that in some embodiments, there can be more or fewer actors identified as potential owners of an asset. For example, there may be a plurality of actors identified for an asset (e.g., tens of actors, hundreds of actors, thousands of actors, etc.), in which case small or subtle differences in the ownership score and/or frequency score between actors may be informative of the likely owner(s) of the asset. Highly active or often-accessed assets may have a high number of actors registering as potential owners, such as, for example, a server stationed as an authorization or security check point for employees of an enterprise.

On the other hand, there may be some assets that fail to register any interactions with known actors. It can be difficult to identify an owner of such orphaned assets using an asset ownership and/or frequency score, as descried herein. However, in some embodiments, an owner of the orphaned asset can be identified by viewing other assets that are within a nearest logical and/or physical distance from the orphan. Ownership scores and/or frequency scores can be used to identify owner(s) of the nearest assets with the owner of the nearest asset being temporarily adopted by the orphan. In some embodiments, a common owner of nearest assets is adopted by the orphan. In some embodiments, the asset type of the orphan is determined, and the common owner of the asset type is adopted by the orphan. In some embodiments, the asset type of the orphan is determined, and the owner of the nearest (logically or physically) asset of the same type is adopted by the orphan.

In some embodiments, a hierarchy of asset ownership can be scaled and/or traversed until a closest asset is identified having an owner; the identified owner can be adopted by the orphan. In some embodiments, a hierarchy of asset ownership can be scaled and/or traversed until a nearest human actor-owner of an asset is identified. The nearest human actor-owner can then be attributed ownership of the orphan asset and/or a notification can be sent to the human actor-owner regarding the orphan asset. Alternatively, or additionally, the asset type is determined from the orphan asset, and a nearest actor is determined based on the type of asset and/or type of actor matching the type of asset. For example, an orphan asset can be part of a system that includes different work groups, departments, or even different business entities. As an exemplary illustration, a system representing Company A can include Subsidiary Company B and Subsidiary Company C, and the orphan asset is a computing system known to be associated generally with Subsidiary Company B (e.g., the computing system is located at Subsidiary B's corporate headquarters). However, the orphan computing system does not have any interactions to facilitate identification of ownership using the systems and/or methods of the present disclosure. Nonetheless, the nearest logical or physical asset having an owner—particularly an owner within Subsidiary Company B—can be adopted as the owner of the orphan computing system. That is, if the nearest logical asset is owned by an actor within Subsidiary Company C, the actor may not be chosen to adopt the orphan asset. Additionally, the owner can meet particular status requirements (e.g., meet or exceed a particular nodal level within the asset ownership hierarchy, meet or exceed a security or permission threshold, be on a predefined or user defined list of orphan owners, etc.) before it can adopt an orphan asset.

It should be appreciated that in addition to, or in the alternative from, the embodiments disclosed above, a threshold ownership score (with respect to a non-orphan asset) can impact whether an actor can adopt an orphan asset. In some embodiments, the hierarchal lineage having a highest average asset ownership score can adopt the orphan asset. In some embodiments, a placeholder or ghost actor is created to adopt orphan assets.

The following now illustrates several different ways of computing factors that may be used to facilitate identification of asset ownership. One factor is the asset ownership score, which indicates the time (or other factor as discussed in more detail below) discounted count of interactions between an asset and an actor and is used as an estimated likelihood that a given actor is a closely attracted actor or (potentially an owner of) a given asset.

In an embodiment, the asset ownership score considers each actor i and each asset j such that $$\text{ownership\_score}(i,j) = \Sigma \text{interaction}(i,j) \times \text{decay}(i,j),$$

where interaction(i,j)=1 (or some other chosen value chosen from the set of $\mathbb{R}$) for each interaction event between actor i and asset j. It should be noted that, as above, the interactions could be any of logon events, social media likes, shares, calling of functions, or virtually any other determined interaction.

A decay factor can be used, as in the foregoing equation, to act as an adjustment to the ownership score formula. It can adjust the quality of asset "ownership" probabilities in regards to fluctuations in interaction age. The decay factor for the foregoing exemplary asset ownership formula can be calculated, for example, by considering each actor i and each asset j such that $$\text{decay}(i, j) = DF\left(\frac{\text{time}_{past}(i, j)}{30}\right)$$

where $\text{time}_{past}(i,j) = \text{time}_{current} - \text{time}_{interaction}(i,j)$ as measured in days. The value of the decay factor, DF, can be a monthly decay factor having a constant value x, where x is a real number between 0 and 1 (i.e., x: $\{x \in \mathbb{R} \mid 0 < x < 1\}$). For example, if DF=0.9 and is implemented in monthly increments, then all interactions occurring within 1 month (e.g., 1-30 days old) of the current date are given an interaction value of 1 (i.e., $DF_0 = (0.9)^0 = 1$). Interactions occurring between 1 and 2 months (e.g., 31-60 days old) previous to the current date are given an interaction value of 0.9 (i.e., $DF_1 = (0.9)^1 = 0.9$). Interactions occurring between 2 and 3 months (e.g., 61-90 days old) previous to the current date are given an interaction value of 0.81 (i.e., $DF_2 = (0.9)^2 = 0.81$). Interactions occurring between 3 and 4 months (e.g., 91-120 days old) previous to the current date are given an interaction value of 0.73 (i.e., $DF_3 = (0.9)^3 = 0.73$), and so on. For example, interactions that occurred 6 months ago are each given an interaction value of 0.53 (i.e., $DF_6 = (0.9)^6 = 0.53$) and consequently count for roughly half as much as interactions that are less than one month old when determining an asset ownership score.

It should be appreciated that in some embodiments, $\text{time}_{past}(i,j)$ and/or DF can be measured or applied according to any preselected or user selected time value, such as seconds, minutes, hours, weeks, months, or years. Further, as provided above, DF can represent a parameterized or non-parameterized function that dynamically weights interactions.

In some embodiments, ownership_score(i,j)= quantile$_{ownership\_score(i,j)}$ over all actors i and all entities j. In some embodiments, such as implementations for asset intelligence, ownership_score(i,j) is quantified as a computed probability of asset ownership.

Another factor that may be used alternatively or in conjunction with other factors is a frequency score. The frequency score can be considered a representation of the rate of interactions over time (e.g., per day) between an actor i and an asset j. For example, for an actor i and an asset j, $$\text{frequency}_{raw}(i, j) = \left(\frac{1}{\text{time}_{most}(i, j)}\right) \sum \text{interaction}(i, j)$$

where interaction(i,j)=1 for each event or interaction between actor i and asset j, and where $$\text{time}_{most}(i, j) = \text{time}_{current} - \min\left(\frac{\text{time}_{interaction}(i, j)}{\sum \text{interaction}(i, j)}\right).$$

Thus, in some embodiments, $$\text{frequency\_score}(i,j) = \text{quantile}(\text{frequency}_{raw}(i,j))$$

over all actors i and all entities j. In some embodiments, such as in implementations for asset intelligence, frequency_score(i,j) is quantified as a computed spin of an actor in relation to a networked asset.

Methods of Facilitating Identification of Ownership of an Asset

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
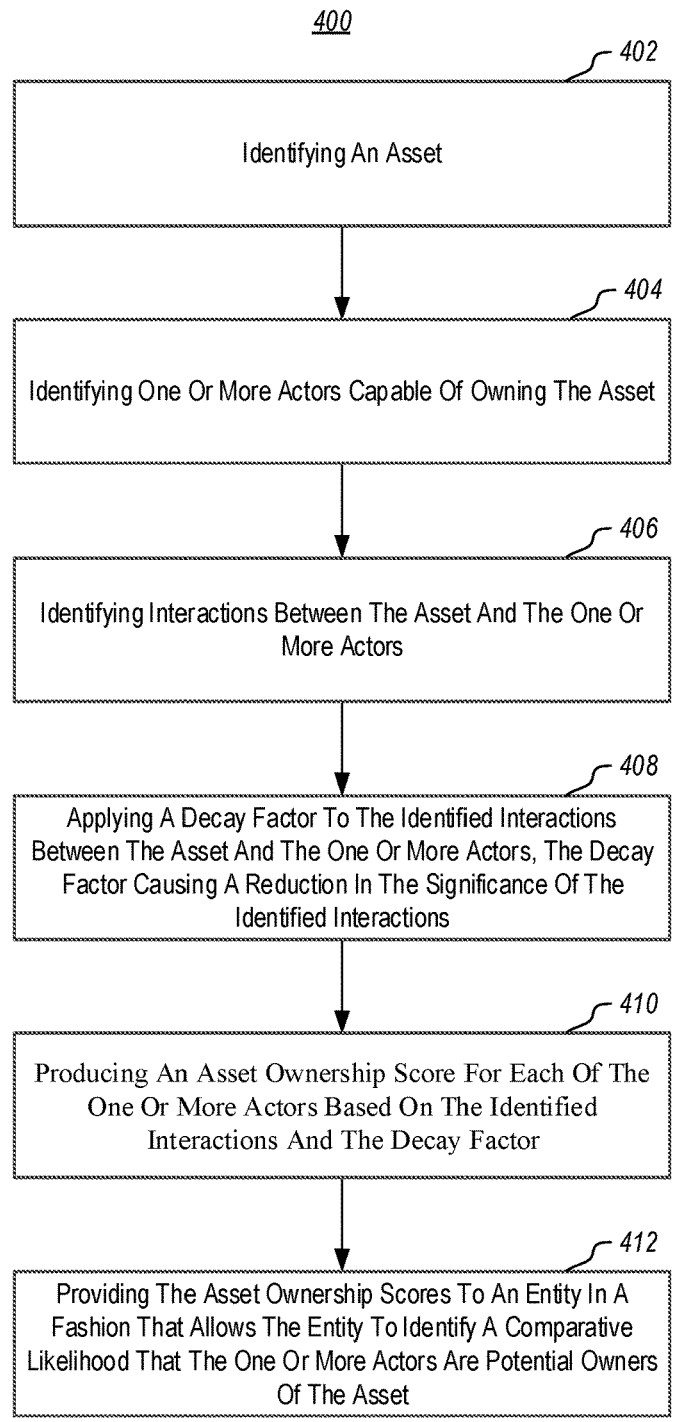
FIG. 4 illustrates an exemplary method for facilitating identification of ownership of an asset.

Referring now to FIG. 4, a method 400 is illustrated.

The method 400 includes acts for facilitating identification of ownership of an asset. The method 400 includes identifying an asset (act 402). An asset is an item capable of being owned.

The method 400 further includes identifying one or more actors (act 404). An actor is an entity capable of owning the asset.

The method 400 further includes identifying interactions between the asset and the one or more actors (act 406). Various examples are illustrated above, including logon events, social media interactions, initiation of a process, etc.

The method 400 further includes applying a decay factor to the identified interactions between the asset and the one or more actors, the decay factor causing a reduction in a significance of the identified interactions (act 408).

The method 400 further includes producing an asset ownership score for each of the one or more actors based on the identified interactions and the decay factor (act 410).

The method 400 further includes providing the asset ownership scores to an entity in a fashion that allows the entity to identify a comparative likelihood that the one or more actors are potential owners of the asset (act 412).

The method 400 may be performed where the decay factor is based on one or more of an elapsed time from when the identified interactions occurred, a physical distance between the one or more actors and the asset, or a logical distance between the one or more actors and the asset. Thus, for example, interactions may be weighted lower as the interactions become more distant from a present time, weighted based on physical distance between an actor an asset, weighted based on the logical distance between and actor and an asset, weighted based on the type of interaction, etc. The logical distance represents the number of computing systems and/or network components that an interaction passes through or touches.

The method 400 may further include normalizing the asset ownership score for each of the one or more actors based on one or more known interaction patterns for a type of asset characterizing the asset. For example, information may be known about how owners typically interact with their owned assets. This can be used to normalize asset ownership scores. An interaction between an actor and an asset more similar to a known interaction between an owner and an asset, may be normalized with a stronger asset ownership score indicating a higher likelihood of that an actor is an owner.

The method 400 may further include normalizing the entity ownership score for each of the one or more actors based on an actual or an expected number of interactions between the asset and the one or more actors.

The method 400 may be practiced where providing the asset ownership scores to the entity in the fashion that allows the entity to identify the comparative likelihood that the one or more actors are potential owners of the asset comprises displaying the asset ownership scores as a ranked order, such that a higher rank indicates a higher likelihood of potential ownership. An example of this is illustrated in FIG. 3A.

The method of claim 1 may further include identifying a frequency of interactions between the asset and the one or more actors; generating a frequency score for each of the one or more actors based on the identified frequency of interactions; and providing the frequency scores to the entity such that a combination of the frequency score and the asset ownership score allows the entity to identify the comparative likelihood that the one or more actors are potential owners of the asset. For example, FIG. 3A illustrates the use of frequency scores.

In some such embodiments, the method 400 may further include normalizing the frequency score for each of the one or more actors based on a baseline frequency of interaction for a type of asset characterizing the asset.

In some embodiments, the method may further include normalizing the frequency score for each of the one or more actors based on an actual or an expected frequency of interaction across the universe of actors and between the asset and the one or more actors.

The method 400 may further include displaying a representation of the asset and displaying a different representation for each actor within at least a subset of the one or more actors. In some embodiments displaying the representation of the asset and displaying the different representation for each actor within at least a subset of the one or more actors is performed such that a likelihood of an actor owning an asset can be evaluated based on the representation and the different representations. Examples of this are illustrated in FIGS. 3A-3C, 5, and 6A-6C.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Figure 7:
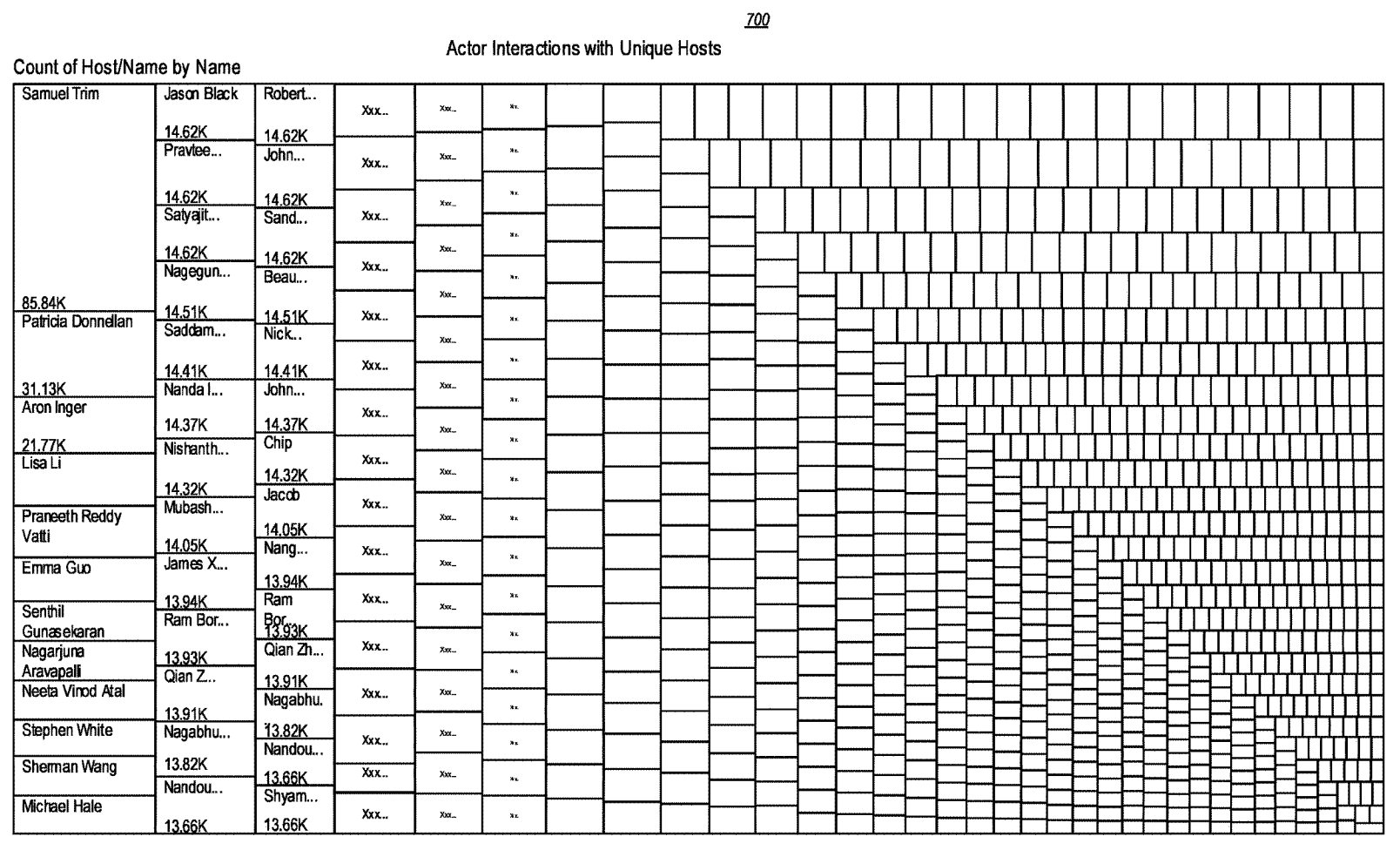

Computer Systems for Displaying Additional Representations of Actor-Asset Relationships As provided above, FIGS. 3A-3C illustrate that the computer systems of the present disclosure enable displaying—in a tabular format—ownership information and/or other information relating to the relationships between assets and owners within a system. In some embodiments, systems and methods of the present disclosure further enable additional or alternative representations of actor-asset relationships. For example, FIGS. 5-7 illustrate different graphs that can be produced to illustrate or exemplify aspects of the actor-asset relationship. In some embodiments, the graphs increase the ease by which information is portrayed such that one or more of an asset ownership score or a frequency score can be illustrated. It should be appreciated that in some embodiments, the displayed graph more intuitively communicates information. The graphs may further be interactive, allowing a user to glean additional information from the graph and/or to traverse different ownership graphs or hierarchies.

FIG. 5, for example, illustrates an orbital graph 500 that can be displayed according to embodiments of the present disclosure. As illustrated, the orbital graph 500 includes a representation of an asset 502 located at the orbital center of the graph 500 and representations of actors 504-1, 504-2, 504-3, 504-4, 504-5 having some relationship to asset 502 (e.g., identified interactions, logical or physical proximity, etc.). Each representation of an actor is positioned on an orbital track 506. The radius of each orbital track is different, and therefore, the actors' distance from the asset 500 is different based on which orbital track 506 the actor is positioned. For example, as shown in FIG. 5, there are four orbital tracks with actor 504-5 being positioned on an outermost orbital track, actor 504-4 being positioned on the penultimate outer orbital track, actor 504-3 being positioned on the second innermost orbital track, and actors 504-1 and 504-2 both being located on the same innermost orbital track.

In some embodiments, the distance between the central representation on an orbital graph and the satellite representations on the orbital graph is an indication of a degree of relatedness. For example, satellites positioned closer to the central representation can be more related to the central representation in one or more ways, whereas satellites positioned farther away from the central representation can be less related to the central representation in one or more ways. As shown in FIG. 5, the central representation is an asset 502 and the satellites represent actors 504-1, 504-2, 504-3, 504-4, 504-5. The distance between the asset 502 and each actor 504-1, 504-2, 504-3, 504-4, 504-5 is proportional to each actor's corresponding ownership score for the asset 502. In some embodiments, and as shown in FIG. 5, the higher an actor's ownership score for the asset, the closer the actor will be positioned to the asset on the orbital graph, and similarly, the lower the actor's ownership score for the asset, the farther away the actor will be positioned from the asset on the orbital graph.

In some embodiments, the distance between each actor and the central asset on the orbital graph can also represent the length of a radius for an orbital track that is centered on the asset. Thus, in some embodiments, an actor's ownership score determines the radius of the orbital track upon which a representation of the actor is positioned. The representations of the actors can be spread out along the corresponding orbital tracks, which in some embodiments can aid a user in viewing the representations on the orbital graph while preserving the information associated with an actor's (or other representation's) respective distance to the asset (or other central representation). This can additionally, or alternatively, increase the ease by which information is relayed and can facilitate identification of a likely owner of the asset based upon actors' position (e.g., radial distance) on the orbital graph.

It should be appreciated that the distance between orbital tracks does not have to be constant. In some embodiments, and as shown in FIG. 5, the distance between the asset 502 and an innermost orbital track and/or between two adjacent orbital tracks can vary. For example, the distance between the asset 502 defining the central focus of the orbital graph 500 and the nearest orbit is greater than the distance between that same innermost orbital track and the second innermost orbital track. Similarly, the distance between the second and third orbital tracks is less than the distance between the third and fourth orbital tracks. On the other and, in some embodiments, the distance between orbital tracks is the same. As shown in FIG. 5, the distance between the first and second orbital track is the same as the distance between the second and third orbital track. Stated another way, in some embodiments, the distance between a central representation and satellite (or an orbital tracks corresponding thereto) can be consistently incremental (e.g., a same distance between two adjacent orbital tracks), or it can vary (e.g., a different distance between two adjacent orbital tracks).

In some embodiments, the orbital tracks represent degrees of affinity to the central representation, and each satellite positioned on an orbital track represents a characteristic or trait of an asset or actor. For example, the center of the orbital graph can represent an asset, and each satellite can represent a characteristic or trait of an actor, and a distance between the central asset and each satellite corresponds to the degree of affinity of that given characteristic or trait with the asset. As a non-limiting example of the foregoing, the orbital graph can depict a server (i.e., an asset) as the central representation with characteristics of an administrator terminal (i.e., an actor) representing the satellites. A nearest satellite can be a logical distance, a second nearest satellite can be a physical distance, and a third nearest satellite can be an ownership score for the administrator panel with respect to the server. In the foregoing example, the orbital graph illustrates that the administrator terminal as a higher degree of relatedness to the server with respect to its logical distance than to either its physical distance or ownership score. Similarly, the administrator terminal has a higher degree of relatedness to the server with respect to its physical distance than to its corresponding ownership score. In some embodiments, this may be despite the fact that the administrator terminal had the highest ownership score with respect to all other identified actors.

In some embodiments, the central representation is an actor, and the satellites represent assets or characteristics of an asset, as provided above. Illustratively, assets can be positioned on orbital tracks about the central actor according to a degree of ownership between the actor and the assets. The actor represented by the central representation on the orbital graph can have a higher degree of ownership (e.g., a higher of ownership score) for the assets whose corresponding representations are positioned closer to the central representation. In such a display, information can be quickly cleaned about a given actor and the asset(s) that it likely owns.

With continued reference to FIG. 5, an orbital graph 500 can include representations of additional assets 512, 522. In some embodiments, the additional assets 512, 522 are present assets related to asset 502. For example, the additional assets 512, 522 can be the same or similar type of asset as asset 502, or alternatively, or additionally, the additional assets 512, 522 can include the same or similar actor-owners as asset 502. Each of the additional assets 512, 522 are shown as being associated with one or more assets 514, 524. In some embodiments, the assets 514, 524 represent a likely owner of the respective asset 512, 522. In some embodiments, the associated asset is a representation of a group of assets that are related to and/or likely owners of the corresponding additional asset.

In some embodiments, the orbital graph 500 as interactive. For example, through a user interface, a user can select one of the additional assets 512, 522. The selected additional asset can then display an orbital graph similar to that shown in FIG. 5 for asset 502. In some embodiments, the orbital graphs are displayed simultaneously. In other embodiments, a single orbital graph is displayed at a time. Accordingly, upon selection of an additional asset, the currently displayed orbital graph representing asset 502 is minimized (e.g., similar to how the additional assets 512, 522 are illustrated and FIG. 5, removed from the viewing area, etc.), and the selected additional asset blossoms into an orbital graph, as described herein.

As illustrated by the foregoing, different implementations displaying various relationships between actors and assets can provide various enlightening perspectives with respect to actor and asset relationships, including asset ownership. As further provided in FIGS. 6A-6C, additional information can be associated with satellites in an orbital graph to communicate other information.

Referring to FIG. 6A, illustrated is an orbital graph 600-1 similar in many respects to the orbital graph illustrated in FIG. 5. The orbital graph 600-1 of FIG. 6A represents asset 602 and its related actors 604-1, 604-2, 604-3, 604-4, 604-5. The satellites representing the actors 604-1, 604-2, 604-3, 604-4, 604-5 are spaced apart from the asset 602 based on corresponding ownership scores. Further, the satellites representing actors 604-1, 604-2, 604-3, 604-4, 604-5 are colored, that is have a color overlaid on them. Each color can represent a characteristic of the represented the actors 604-1, 604-2, 604-3, 604-4, 604-5, such as the type of actor. For example, the colors can differentiate between categories of actors, can differentiate the type of actor broadly (e.g., a human actor or a machine actor), a hierarchal level of the actor (e.g., an administrator-level human actor versus an ordinary user), a permission level of the actor, and/or a genre or subtype of the actor (e.g., social media publication, IP address, computing component, user account, etc.).

In some embodiments, the orbital graph is not statically displayed. Rather, in some embodiments, the satellites move along their corresponding orbital track at one or more speeds. FIGS. 6A-6C each illustrate the same orbital graph but at progressive time points. Movement of the satellites representing the actors 604-1, 604-2, 604-3, 604-4, 604-5 can be seen between each progression of time represented by the orbital graphs 600-1, 600-2, 600-3 of FIGS. 3A, 3B, and 3C, respectively. Further, the orbital graphs 600-1, 600-2, 600-3 illustrate that some satellites move faster or slower than other satellites.

In some embodiments, the speed at which the satellite orbits the central representation corresponds to a frequency score. As shown in FIGS. 6A-6C, the frequency scores for actors 604-1, 604-2, 604-3, 604-4, 604-5 with respect to asset 602 are determinative of the speed by which the corresponding satellites orbit asset 602. As can be seen in the figures, the satellite representing actor 604-3 has a low frequency score given the relatively short distance traveled during the illustrated time lapse. On the other hand, the satellite representing actor 604-4 has a relatively high frequency score given that it made a full revolution around asset 602 during the illustrated time lapse.

Accordingly, as shown in FIGS. 6A-6C, orbital graphs of the present disclosure can display and communicate a plethora of information related to asset ownership such that a user can glean information efficiently and quickly by observing the displayed orbital graph. The orbital graphs disclosed herein can contextualize relationships between assets and actors, such as a likelihood of ownership and/or a frequency by which actors interact with assets, in a simple visual representation. It should be appreciated that any predefined or user selected number of satellites (e.g., actors) can be displayed on an orbital graph which can alternatively, or additionally, be limited based on meeting or exceeding one or more thresholds (e.g., an ownership score at, above, or below a certain level; at, above, or below a threshold hierarchal level; at, above, or below a threshold permission level, etc.).

Similar information illustrated in orbital graphs can be represented in other forms. For example, FIG. 7 illustrates a tile-based display that can help facilitate identification of asset ownership, among other things. As shown in FIG. 7, each tile represents an actor for a given asset, and the size of each tile corresponds to the degree of relatedness of the actor to the asset. As shown in FIG. 7, the largest tile has the highest ownership score and therefore the highest likelihood of ownership of the asset. Additionally, the tiles can be color coded similar to the satellites in FIGS. 6A-6B to relay additional information about the illustrated actors.

The following now illustrates several different ways of computing factors that may be used in generating displays, as described herein. In some embodiments, the orbital distance indicates the time (or other factor) discounted count of interactions between an actor and an asset and is used as an estimated likelihood that a given actor is a closely attracted actor (or potentially an owner) of a given asset. In the orbital graph model, this value determines the distance between the actor and the orbited asset. It should be appreciated that this value can be directly related to the ownership score, and in such embodiments, the orbital distance can be determined by determining the ownership score, as provided above. The higher the ownership score, the shorter the orbital distance.

In some embodiments, the actor having the highest ownership score is automatically positioned at the first orbital distance. Each other orbital distance can be determined relative (proportional) to highest ownership score, relative (proportional) to the asset, or relative (proportional) to the next highest ownership score. Using the actors of FIG. 3A as an illustrative example, a satellite representing Server A123 can be placed at a closest orbital distance. Each of the remaining three actors can have satellites placed at successive equidistant orbital distances away from the closest orbital distance for Server A123 (i.e., ignoring the relative difference between ownership scores), or alternatively, the remaining orbital distances are determined as a proportional distance based on the difference between the highest ownership score (i.e., 99) and each successive ownership score. For example, John Smith has the next highest ownership score of 97 followed by Sally Johnson with 94 and Vendor X with 30. The orbital distance from the closest orbit can be calculated as being 2 units away (i.e., 99-97), 5 units away (i.e., 99-94), and 69 units away (i.e., 99-30), respectively. Alternatively, or additionally, the orbital distance is can be augmented by a scalar multiple.

It should be appreciated that similar to the decay factor calculated above, an orbital decay factor can act as an adjustment to the orbital distance, thereby adjusting the quality of asset "ownership" (distance) probabilities in regards to various fluctuations.

Additionally, the orbital frequency can be the rate of interactions over time (e.g., per day) between an actor and a target asset. In the orbital graph model, that orbital frequency determines the speed at which the actor orbits an entity. The orbital frequency can be determined in the same or similar manner provided above with respect to the frequency score.

Methods of Displaying Representations of Actor-Asset Relationships

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 8:
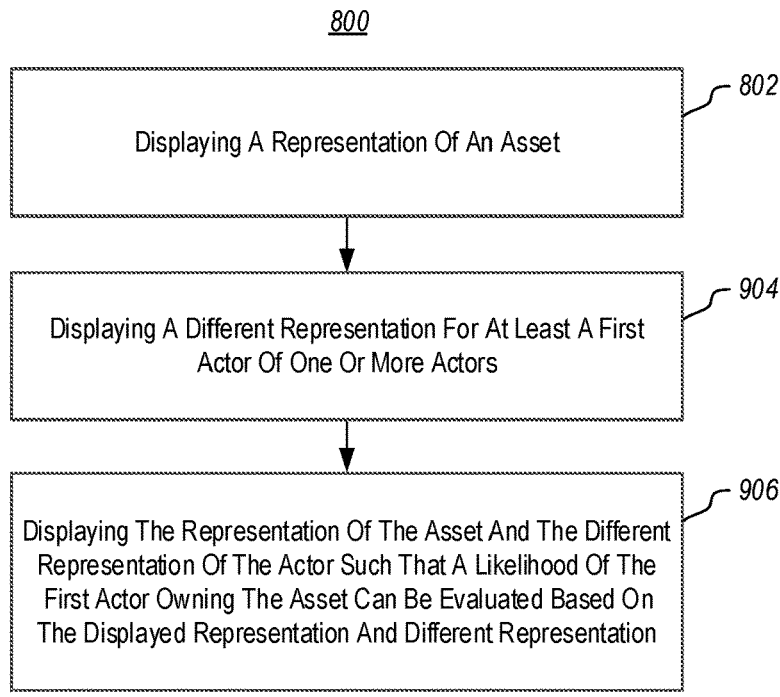
FIG. 8 illustrates an exemplary method of displaying representations of an asset and one or more actors to facilitate identification of an owner of the asset.

Referring now to FIG. 8, a method 800 is illustrated. The method 800 includes acts for displaying representations of an asset and one or more actors to facilitate identification of an owner of the asset. The method 800 includes displaying a representation of an asset (act 802). For example, FIG. 6 illustrates assets as orbital centers of a graphs.

The method 800 further includes displaying a different representation for at least a first actor of the one or more actors (act 804). For example, FIG. 5 illustrates representations of actors orbiting the representations of assets.

The method 800 further includes displaying the representation of the asset and displaying the different representation for the first actor is performed such that a likelihood of the first actor owning the asset can be evaluated based on the representation and the different representation (act 806). For example, in FIG. 5, orbital distance and/or speed of orbit may be used to represent likelihood of an actor owning an asset.

The method 800 may further include overlaying a color on the representation, the color representing a type of asset.

The method 800 may be practiced where a color of the representation comprises a type of actor.

As noted above, the method 800 may be practiced where the representation and the different representation comprise elements of an orbital display.

In some such embodiments, as illustrated above, the method 800 my further include displaying a related representation, the related representation comprising a second asset that is disposed in physical or logical proximity to the asset.

The method 800 may be practiced where the representation of the asset is positioned at a center of the orbital display, and wherein the different representation for the first actor is positioned in an orbit around the representation of the asset.

In some embodiments, a distance of the orbit away from the representation corresponds to the likelihood of the first actor owning the asset.

In some such embodiments, the method 800 may further include displaying a second different representation for a second actor in a second orbit around the representation of the asset, wherein the second orbit is positioned a shorter distance away from the representation of the asset than the orbit of the different representation, indicating the second actor has a higher likelihood of ownership for the asset compared with the first actor.

The method 800 may be practiced where an orbital speed of the different representation for the first actor corresponds to a frequency of identified interactions between the asset and the first actor.

In some such embodiments, the method 800 may further include displaying a second different representation for a second actor, wherein a second orbital speed of the second different representation is slower than the orbital speed of the different representation, indicating the second actor has a lower frequency of identified interactions with the asset compared with the first actor.

Figure 9:
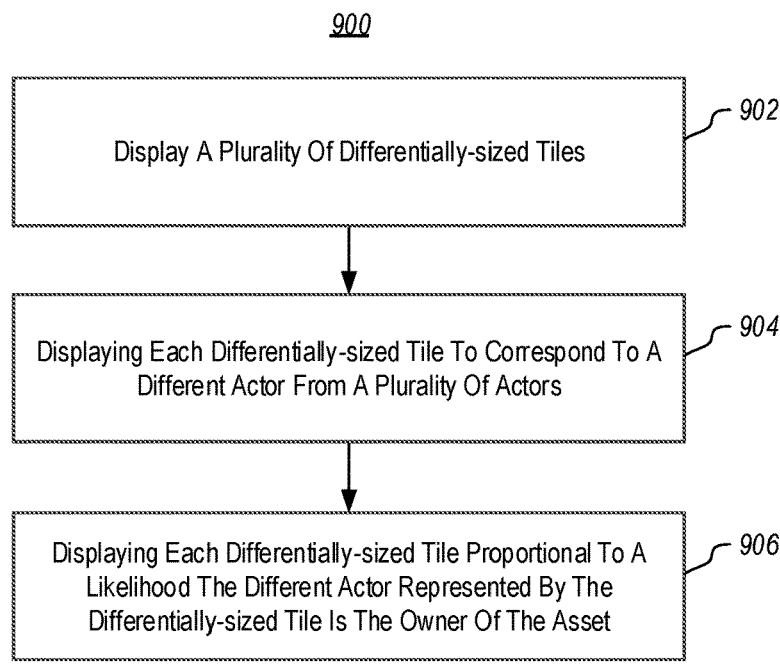
FIG. 9 illustrates another exemplary method of displaying representations of an asset and one or more actors to facilitate identification of an owner of the asset.

Referring now to FIG. 9, a method 900 is illustrated. The method 900 includes acts for facilitating identification of an owner of an asset. The method 900 includes display a plurality of differentially-sized tiles (act 902).

The method 900 further includes displaying each differentially-sized tile of the plurality of differentially-sized tiles to correspond to a different actor from a plurality of actors having at least one interaction with the asset (act 904).

The method 900 further includes displaying each differentially-sized tile proportional to a likelihood the different actor represented by the differentially-sized tile is the owner of the asset (act 906).

An example of this is illustrated in FIG. 7 above.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of displaying representations of a computing asset and one or more actors, wherein an actor is an entity capable of owning an asset, to facilitate identification of an owner of the asset, the method comprising:
   monitoring computing interactions between actors and an asset;
   computing probabilities of actors being owners of the asset based on the interactions;
   displaying a representation of the asset in a graphical user interface;
   displaying a first different representation for a first actor of the one or more actors in the graphical user interface;
   displaying a second different representation for a second actor of the one or more actors in the graphical user interface; and
   wherein displaying the representation of the asset and displaying the different representations for the first and second actors is performed such that a probability of the first actor owning the asset as compared to a probability of the second actor owning the asset can be evaluated based on the representation and the differences between the first and second different representations displayed in the graphical user interface.

2. The method of claim 1, further comprising overlaying in the graphical user interface a color on the representation, the color representing a type of asset.

3. The method of claim 1, wherein a color of the representation comprises a type of actor.

4. The method of claim 1, wherein the representation and the first different representation comprise elements of an orbital display.

5. The method of claim 4, further comprising displaying in the graphical user interface a related representation, the related representation comprising a second asset that is disposed in physical or logical proximity to the asset.

6. The method of claim 4, wherein the representation of the asset is positioned at a center of the orbital display, and wherein the first different representation for the first actor is positioned in an orbit around the representation of the asset.

7. The method of claim 6, wherein a distance of the orbit away from the representation corresponds to the probability of the first actor owning the asset.

8. The method of claim 7, further comprising displaying in the graphical user interface the second different representation for the second actor in a second orbit around the representation of the asset, wherein the second orbit is positioned a shorter distance away from the representation of the asset than the orbit of the first different representation, indicating the second actor has a higher probability of ownership for the asset compared with the first actor.

9. The method of claim 6, wherein an orbital speed of the first different representation for the first actor corresponds to a frequency of identified interactions between the asset and the first actor.

10. The method of claim 9, further comprising displaying in the graphical user interface the second different representation for the second actor, wherein a second orbital speed of the second different representation is slower than the orbital speed of the first different representation, indicating the second actor has a lower frequency of identified interactions with the asset compared with the first actor.

11. A computer system comprising:
   one or more processors; and
   one or more computer-readable media having stored thereon instructions that are executable by the one or more processors to configure the computer system to display representations of a computing asset and one or more actors, wherein an actor is an entity capable of owning an asset, to facilitate identification of an owner of the asset, including instructions that are executable to configure the computer system to perform at least the following:
      monitor computing interactions between actors and an asset;
      compute probabilities of actors being owners of the asset based on the interactions;
      display a representation of the asset in a graphical user interface;
      display a first different representation for a first actor of the one or more actors in the graphical user interface;
      display a second different representation for a second actor of the one or more actors in the graphical user interface; and
      wherein displaying the representation of the asset and displaying the different representations for the first and second actors is performed such that a probability of the first actor owning the asset as compared to a probability of the second actor owning the asset can be evaluated based on the representation and the differences between the first and second different representations displayed in the graphical user interface.

12. The system of claim 11, wherein the one or more computer-readable media further have stored thereon instructions that are executable by the one or more processors to configure the computer system to overlay in the graphical user interface a color on one or more of the representation or the different representation, the color representing a type of asset or a type of actor.

13. The system of claim 11, wherein the representation and the first different representation comprise elements of an orbital display.

14. The system of claim 13, wherein the one or more computer-readable media further have stored thereon instructions that are executable by the one or more processors to configure the computer system to display in the graphical user interface a related representation, the related representation comprising a second asset that is disposed in physical or logical proximity to the asset.

15. The system of claim 13, wherein the representation of the asset is positioned at a center of the orbital display, and wherein the first different representation for the first actor is positioned in an orbit around the representation of the asset.

16. The system of claim 15, wherein a distance of the orbit away from the representation corresponds to the probability of the first actor owning the asset.

17. The system of claim 16, wherein the one or more computer-readable media further have stored thereon instructions that are executable by the one or more processors to configure the computer system to display in the graphical user interface the second different representation for the second actor in a second orbit around the representation of the asset, wherein the second orbit is positioned a shorter distance away from the representation of the asset than the orbit of the first different representation, indicating the second actor has a higher probability of ownership for the asset compared with the first actor.

18. The system of claim 15, wherein an orbital speed of the first different representation for the first actor corresponds to a frequency of identified interactions between the asset and the first actor.

19. The system of claim 18, wherein the one or more computer-readable media further have stored thereon instructions that are executable by the one or more processors to configure the computer system to display in the graphical user interface the second different representation for the second actor, wherein a second orbital speed of the second different representation is slower than the orbital speed of the different representation, indicating the second actor has a lower frequency of identified interactions with the asset compared with the first actor.

20. A computer system comprising:
one or more processors; and
one or more computer-readable media having stored thereon instructions that are executable by the one or more processors to configure the computer system to display different representations of one or more actors with respect to an asset to facilitate identification of an owner of the asset, including instructions that are executable to configure the computer system to perform at least the following:
display a plurality of differentially-sized tiles,
wherein each differentially-sized tile of the plurality of differentially-sized tiles correspond to a different actor from a plurality of actors having at least one interaction with the asset, and
wherein a size of each differentially-sized tile for each actor is proportional to a computed probability that an actor represented by a particular tile is the owner of the asset such that probabilities of the plurality of actors being owners of the asset can be qualitatively compared by comparing corresponding tiles.

* * * * *